(12) United States Patent
Wooton et al.

(10) Patent No.: US 10,747,634 B2
(45) Date of Patent: Aug. 18, 2020

(54) SYSTEM AND METHOD FOR UTILIZING MACHINE-READABLE CODES FOR TESTING A COMMUNICATION NETWORK

(71) Applicant: Fluke Corporation, Everett, WA (US)

(72) Inventors: Clinton J. Wooton, Lake Stevens, WA (US); John Paul Hittel, Scottsdale, AZ (US); J. David Schell, Austin, TX (US)

(73) Assignee: FLUKE CORPORATION, Everett, WA (US)

(*) Notice: Subject to any disclaimer, the term of this patent is extended or adjusted under 35 U.S.C. 154(b) by 122 days.

(21) Appl. No.: 16/160,693

(22) Filed: Oct. 15, 2018

(65) Prior Publication Data

US 2019/0050310 A1 Feb. 14, 2019

Related U.S. Application Data

(63) Continuation of application No. 14/924,408, filed on Oct. 27, 2015, now Pat. No. 10,114,717.

(51) Int. Cl.
| | | |
|---|---|---|
| *G06F 11/00* | (2006.01) | |
| *G06F 11/263* | (2006.01) | |
| *H04L 29/08* | (2006.01) | |
| *H04L 12/26* | (2006.01) | |
| *H04L 12/24* | (2006.01) | |

(52) U.S. Cl.
CPC ............ *G06F 11/263* (2013.01); *H04L 43/50* (2013.01); *H04L 67/18* (2013.01); *H04L 41/0843* (2013.01)

(58) Field of Classification Search
CPC ............ G06F 11/2205; G06F 11/2221; G06F 11/263; G06F 11/2635; H04L 43/50; H04L 67/18
See application file for complete search history.

(56) References Cited

U.S. PATENT DOCUMENTS

| | | |
|---|---|---|
| 6,792,452 B1 | 9/2004 | Philyaw |
| 8,238,693 B2 * | 8/2012 | Nurminen ............... H04N 5/775 382/286 |
| 9,678,484 B2 | 6/2017 | Nixon et al. |
| 2007/0099623 A1 | 5/2007 | Stephensen et al. |
| 2008/0042840 A1 | 2/2008 | Christopher |
| 2009/0058638 A1 | 3/2009 | Kanagala et al. |

(Continued)

FOREIGN PATENT DOCUMENTS

| | | |
|---|---|---|
| WO | 2014/151071 A1 | 9/2014 |
| WO | 2014/151071 A4 | 10/2014 |

OTHER PUBLICATIONS

European Search Report for Application No. 16195833.May 1862 dated Mar. 13, 2017, 8 pp.

*Primary Examiner* — Joshua P Lottich
(74) *Attorney, Agent, or Firm* — Seed IP Law Group LLP

(57) ABSTRACT

A testing device which includes a testing unit to perform test procedures on network elements of a communication network and a machine-readable code reader to read a machine-readable code associated with a network element of the communication network. The testing device further includes a computer device configured to: (i) determine a component type associated with the machine-readable code data read; (ii) select from a plurality of configuration files a configuration file based on the component type determined; and (iii) configure the test unit for a test procedure using the configuration file selected, and to perform the test procedure on the network element.

19 Claims, 10 Drawing Sheets

(56) References Cited

U.S. PATENT DOCUMENTS

| | | |
|---|---|---|
| 2009/0106778 A1 | 4/2009 | Pomeroy et al. |
| 2013/0037605 A1 | 2/2013 | Cok et al. |
| 2013/0094538 A1 | 4/2013 | Wang |
| 2013/0120449 A1* | 5/2013 | Ihara .................. G06F 11/0727 345/633 |
| 2014/0179231 A1 | 6/2014 | Charania et al. |
| 2014/0187173 A1 | 7/2014 | Partee |
| 2014/0254390 A1 | 9/2014 | Ansley et al. |
| 2014/0266765 A1 | 9/2014 | Neeley et al. |
| 2014/0267399 A1* | 9/2014 | Zamer .................... H04L 67/20 345/633 |
| 2014/0281737 A1 | 9/2014 | Compann et al. |
| 2015/0013450 A1 | 1/2015 | Doran |
| 2015/0038130 A1 | 2/2015 | Mao et al. |
| 2016/0035246 A1* | 2/2016 | Curtis .................... H04L 67/10 434/219 |
| 2016/0241996 A1 | 8/2016 | Bourque et al. |
| 2017/0019264 A1 | 1/2017 | Nugent et al. |
| 2018/0062869 A1 | 3/2018 | Nugent et al. |
| 2020/0050860 A1* | 2/2020 | Bare ................. G06K 9/00671 |

\* cited by examiner

SYSTEM AND METHOD FOR UTILIZING MACHINE-READABLE CODES FOR TESTING A COMMUNICATION NETWORK

TECHNICAL FIELD

The disclosed embodiments generally relate to a system and method for testing a communication network, and more particularly, using machine readable codes for testing a communication network.

BACKGROUND

Description of the Related Art

Testing network elements, such as cable end points, of a communication network, is prone to delays and human error due to errors selecting an appropriate testing specification for a particular network element, confusing crowded network elements, difficulty locating a network element at a communication network site, and inputting into a testing device an incorrect identification code for a network element that is being tested.

Accordingly, there is a need for a system and method to overcome the aforementioned challenges.

BRIEF SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a testing device which includes a testing device which includes a testing unit to perform test procedures on network elements of a communication network and a machine-readable code reader to read a machine-readable code associated with a network element of the communication network. The testing device further includes a computer device configured to: (i) determine a component type associated with the machine-readable code read; (ii) select from a plurality of configuration files a configuration file based on the component type determined; and (iii) configure the test unit for a test procedure using the configuration file selected, and to perform the test procedure on the network element.

In a further aspect, a mobile device is disclosed. The mobile device includes a machine-readable code reader to read a machine-readable code and a computer. The computer is configured to receive instructions to perform a testing procedure on a first network element that is included in a communication network, the first network element having an associated first machine-readable code. The computer is further configured to receive reader output associated with a second machine-readable code that was read by the reader, wherein, the second machine-readable code is associated with a second network element of the communication network that was encountered, wherein the second machine-readable code is associated with second network element data that indicates the location of the second network element, access a location of the first network element included in first network element data associated with the second machine-readable code, access the location of the second network element in the second network element data associated with the second machine-readable code read, and indicate by providing at least one of a map or navigational directions, the location of the first network element under test relative to the second network element.

BRIEF DESCRIPTION OF THE DRAWINGS

The accompanying appendices and/or drawings illustrate various non-limiting, example, inventive aspects in accordance with the present disclosure in which.

DETAILED DESCRIPTION

Figure 1:
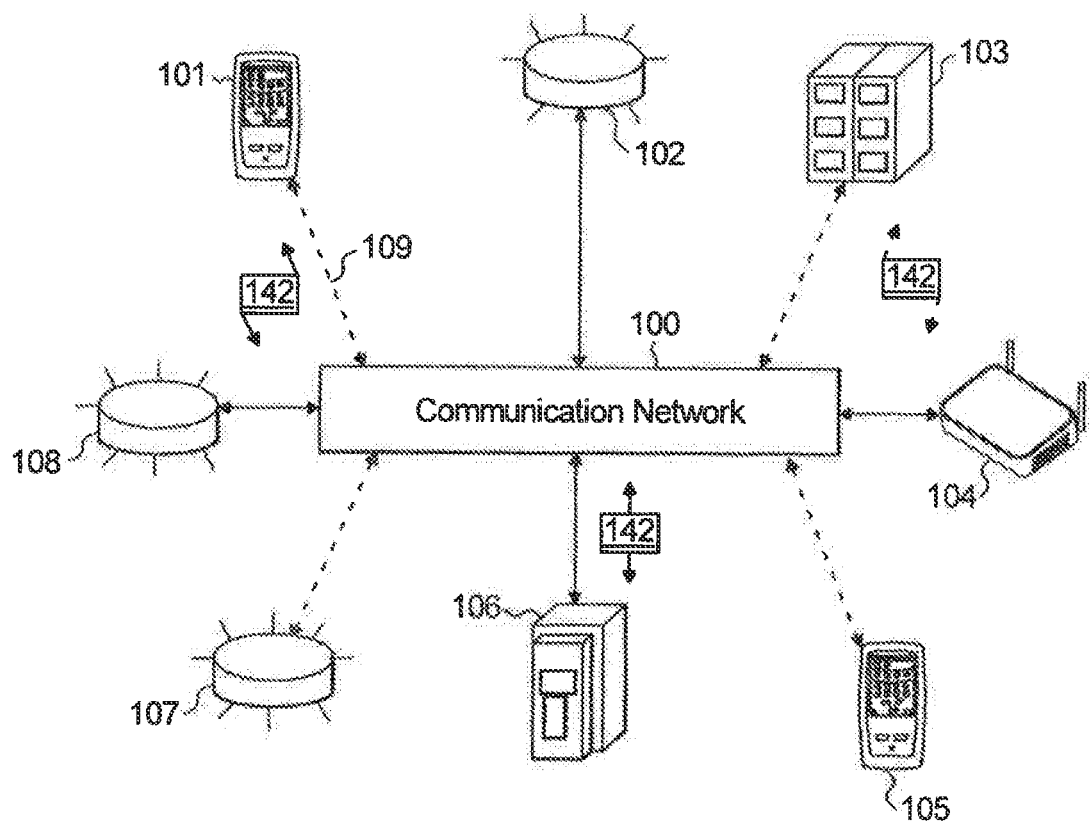
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc., may be used in the communication network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
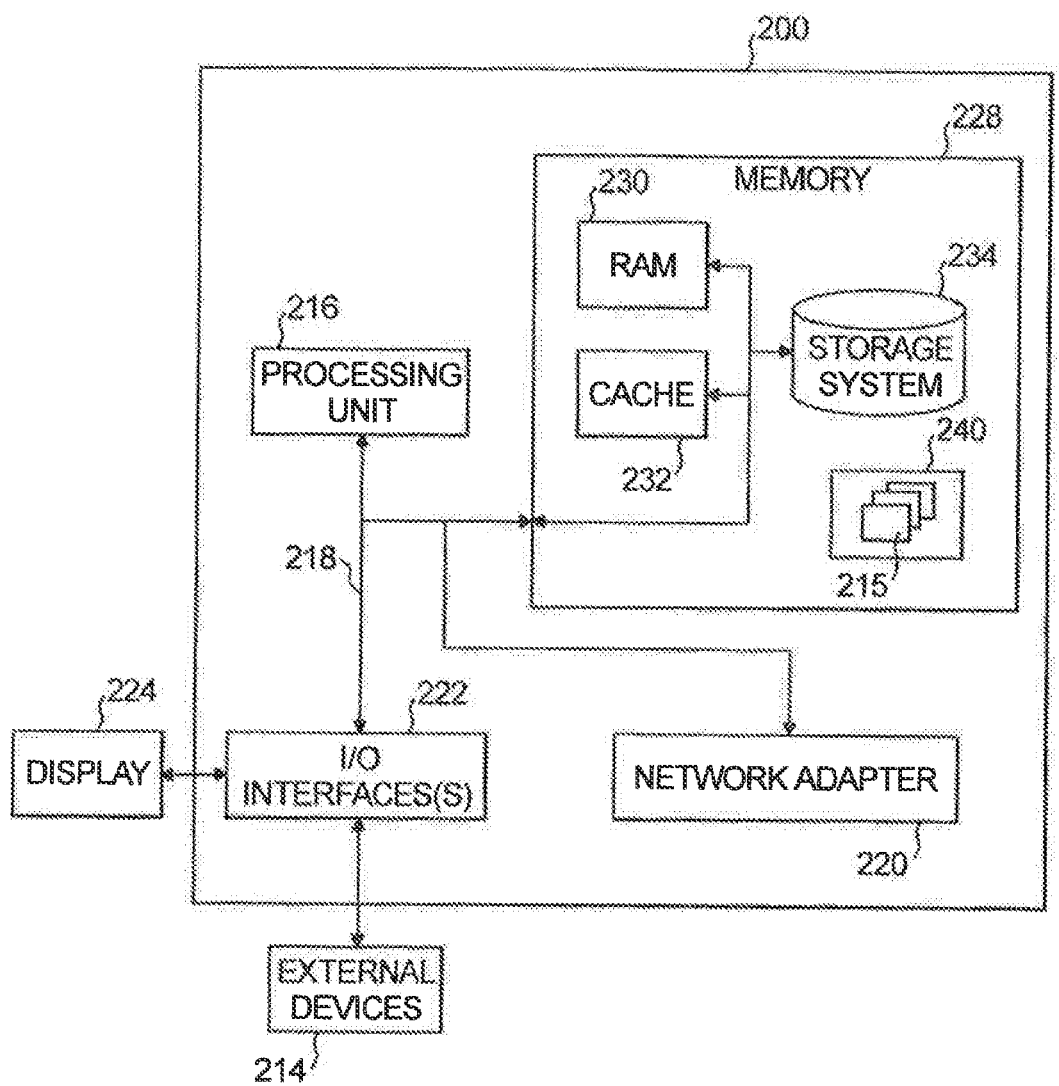
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided. With reference now to FIGS. 3-10, a cable testing system 300 is generally shown in which one or more testing devices 302 use machine-readable codes (MRCs) to access or store information and to share information with other testing devices 302. The information that is accessed, stored, or shared can be embedded in a machine-readable code or the machine-readable code can be used to store the information (e.g., in a database, in association with a communication network component). For example, the testing devices 302 can communicate with a cloud-based server 304 that accesses a database (DB) 314. An example testing device 302 is a portable tool than can include a computer system that functions as a node (e.g., nodes 101-105, 107, or 108) of a network 306, wherein network 306 is similar to communication network 100 shown in FIG. 1. Similarly, the server 304 can be a web server that includes a computer system that functions as a node (e.g., node 106) of network 306.

A machine-readable code can be any code that a machine can read and extract information from, wherein the information includes a unique identification of an associated network element (NE). Examples of codes include, but are not limited to, radio frequency ID (RFID) codes or optical codes, such as one-dimensional codes (e.g., barcodes) or two-dimensional matrix codes (e.g., QRcodes).

The testing device 302 communicates with the network 306 using a first communication link 307, and the server 304 communicates with the network 306 using a second communication link 309. The first and second communication links 307, 309 can each include a single or multiple wired and/or wireless links. In embodiments, some of these links use near-field communication, such as radio frequency identification (RFID), Bluetooth, infrared communication, or the like. In embodiments, the network 306 includes the Internet, but is not limited thereto as it may encompass other suitable network types (e.g., WAN, LAN, etc.,). As indicated by the dotted lines, the testing device 302 can be selectively coupled to the network 306 so that the first communication link 307 can be intermittent, e.g., disrupted and reestablished. The second communication link 309 can be stable and readily available during operation times for communicating with the testing device 302. In an embodiment, the testing devices 302 communicate indirectly with the cloud-based server 304 via a communication device (not shown), such as a mobile phone, tablet, or laptop computer.

The testing device 302 and the cloud-based server 304 can each be configured similarly to the network computing device 200 shown in FIG. 2, such as to include a processing unit 216, a network adapter 220, an I/O interface 222, and memory 228.

It is to be understood network testing system 300 may encompass a variety of different types of cabling testing devices 302. Examples include, and are not limited to the flowing Fluke Network® instruments: OptiFiber® Pro OTDR; CertiFiber® Pro Optical Loss Test Set and the DSX-5000 CableAnalyzer™. It is to be further appreciated the illustrated embodiments of the present disclosure encompass tests for network cable including diagnostics, verification, qualification, and certification. With regards to certification testing, and as a non-limiting example, the Versiv™ product from Fluke Network® may be used to facilitate such cable certification.

In operation, the testing device 302 conducts tests on components of a communication network under test 308. Components of the network under test 308 can include, for example, cables, routers, switches, end-devices, etc. The testing device 302 may conduct a cabling test, e.g., for diagnostics, verification, certification, or qualification of copper or fiber cable. Cables to be tested can include low-voltage CAT3, CAT5, CAT5E, CAT6, UTP, STP, SSTP and/or FTP data cables, standard voltage electrical wiring, and/or connectors (e.g., connecting devices) that connect two or more cables) that form a portion of the network under test 308 within a site (e.g., a home, office, school, and the like).

In an example test procedure, a cable interface of the testing device's I/O interface 222 is coupled to an endpoint of a cable to test the cable. The testing device 302 can transmit test signals and receive responses to test signals. An example test procedure can include, for example, a cable integrity test or a network connectivity test associated with one or more network component (e.g., cables (including cable endpoints), routers, switches, end-devices, etc.).

Machine-readable codes (machine-readable codes) 312 are associated with respective network elements 310, wherein a network element 310 can include a group of components or a single component. The machine-readable codes 312 include a unique identifier (ID) that identifies the associated network element 310. The machine-readable codes 312 can include additional information associated with the associated network element 310 and/or function as an index to information stored in a database, such as database 314.

Figure 3:
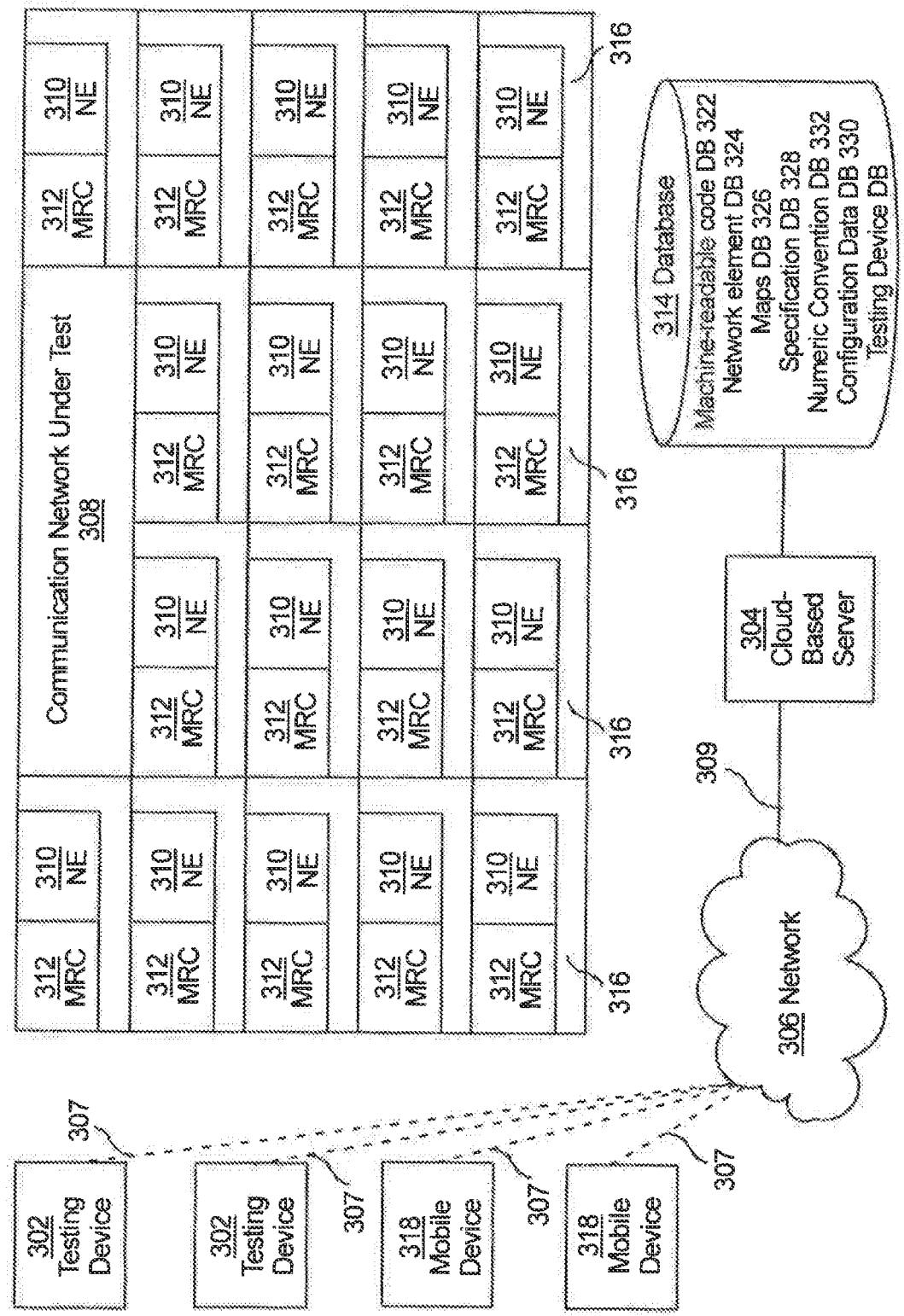
FIG. 3 illustrates a schematic diagram of a communication network testing system in which machine-readable codes are associated with respective network elements of a communication network under test in accordance with the disclosure.

As illustrated in FIG. 3, database 314 can be accessed by cloud-based server 304. Additionally, multiple testing devices 302 can access information associated with components 310 stored in database 314 via the cloud-based server 304, which can include collaboratively updating the information.

The testing devices 302 can read the machine-readable codes 312 to access related information embedded in the machine-readable codes 312 or use the ID as an index to access related information stored in a database, such as a local database or database 314. Mobile devices 318, such as cellular phones, smart phones, laptop computers, tablet computers, etc., can also be provided that can read the machine-readable codes and access related information.

The site of the communications network under test 308 can include a plurality of sections, such as rooms, corridors, closets, or cubicles, referred to as cubes 316. A map can be accessed that indicates relative locations of cubes 316, machine-readable codes 312, and/or network elements 310. During a testing procedure, a testing device 302 can test a first network element 310, such as an endpoint of a cable that is coupled to a wall plate located in a first cube 316. The operator of the testing device 302 may seek a second network element 310 that is related to or complementary to the first network element 310, such as the other endpoint of the cable, which may be coupled, for example, to a patch panel in a wiring closet located in a second cube 316. The second cube 316 may be positioned in a location remote from the first cube 316, which may be on the same story as the first cube 316 of a building, a different story of the building, or in a different building.

Figure 4:
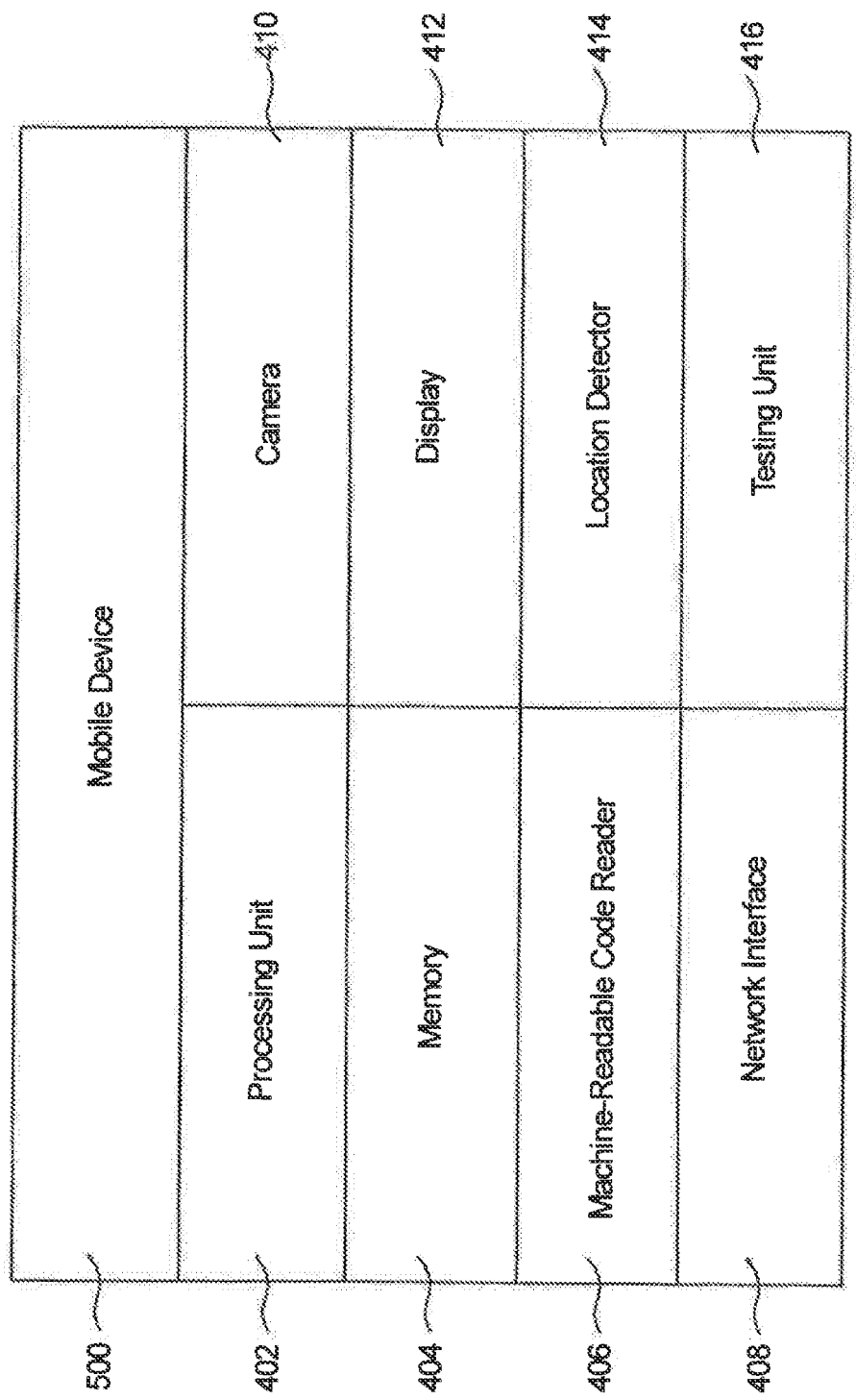
FIG. 4 illustrates a schematic diagram of a mobile device of the communication network testing system shown in FIG. 3.

With reference to FIG. 4, an example testing device 302 is shown. Configuration of testing device 302 corresponds to the configuration of computing device 200 of FIG. 2, with some additional features. For purposes of clarity, certain, but not all, features of the testing device 302 are shown in FIG. 4. Omission of a feature in FIG. 4 that is shown in FIG. 2 is not an indication that the feature is not included in testing device 302.

The testing device 302 includes a processing unit 402, which corresponds to processing unit 216; a memory 404, which corresponds to memory 228; a machine-readable code reader 406; a cable interface 408; a camera 410; a display 412, which corresponds to display 224; a location detector 414; and a testing unit 416.

The machine-readable code reader 406 includes hardware and/or software modules for reading machine-readable codes and outputs a corresponding digital signal. Examples of machine-readable code readers 406 include barcode readers, QRcode readers, and RFID readers.

The cable interface 408 can include one or more cable ports (e.g., an Ethernet port, data cable jacks such as RJ 45 jacks, wire clamps, optical ports, and the like), that interface with a network element, such as a cable. Test signals and responses can be transmitted and received via the cable interface 408.

The location detector 414 includes hardware and/or software modules for sensing a location of the testing device 302. The location detector 422 can include, for example, a Global Positioning System (GPS) sensor.

The testing unit 416 includes hardware and/or software modules for performing the network testing, including the diagnostics, verification, qualification, and certification.

The testing device's processing unit 402 can be configured to infer a location, e.g., a geolocation, of the testing device 302 from network signals such as IP address, RFID, WIFI, and Bluetooth MAC addresses, and/or a GSM/CDMA cell ID associated with the testing device 302, and to output location data indicative of a location of the testing device 302. The location data can include geolocation data and/or a position of the testing device 302 inside a building, such as relative to a floor map or a reference point. For example, location services applications can be used to infer location of a device based on network infrastructures, e.g., WIFI access points or cell towers.

Figure 5:
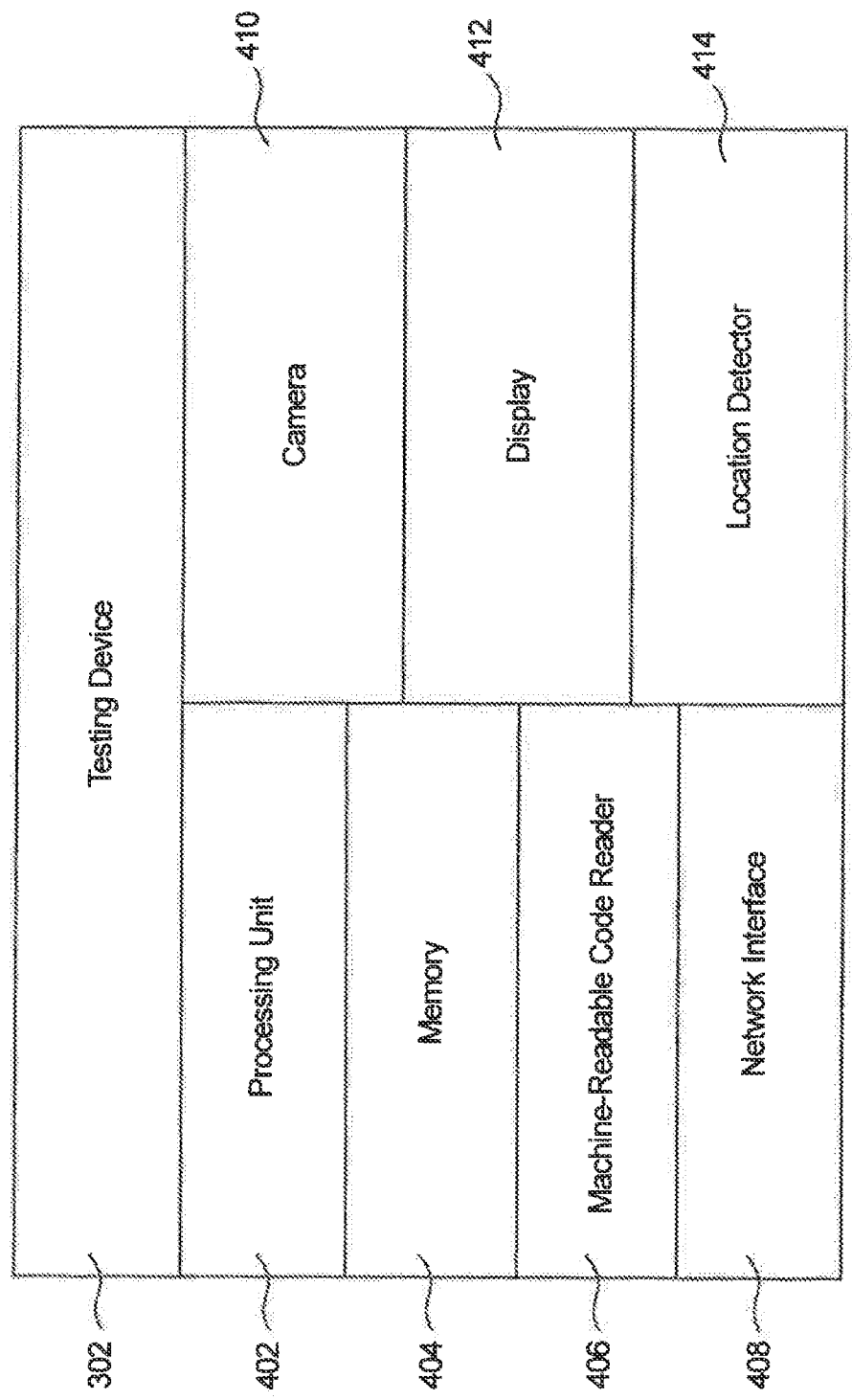
FIG. 5 illustrates a schematic diagram of a testing device of the communication network testing system shown in FIG. 3.

With reference to FIG. 5, a mobile device 318 is shown that can read, generate, and/or update machine-readable codes and use information in the machine-readable codes, such as to locate network elements of a communications network under test 308. The mobile device 318 includes the same units 402-414 described for the testing device, but does not include the testing unit 416 that tests the network elements 310.

In accordance with an embodiment, the machine-readable code 312 that is associated with a network element 310 is further associated with location data that indicates the location of the network element 310. The location data can be embedded in the machine-readable code 312 or can be accessed using identification information indicated by the machine-readable code 312. The location data can indicate a location that is relative to a location reference point or defines an absolute location, such as latitude and longitude.

In an embodiment, the mobile device 318 can perform the same operations at the testing device 302 other than testing performed with the test unit 408. Operations described throughout the disclosure as being performed by a testing device 302 that do not involve the test unit 408 can also be interpreted as being performed by a mobile device 318. Similarly, operations described throughout the disclosure as being performed by a mobile device 318 can also be interpreted as being performed by a testing device 302.

The cloud-based server 304 can include program modules (e.g., program modules 215 stored by memory 228 of the server 304) to perform the method disclosed, and can access database 314. Database 314 stores a machine-readable code database 322, a network element database 324, a map database 326, a specification database 328, a configuration database 330, and a numbering convention database 332. The machine-readable code database 322 associates machine-readable code data to ID codes that identify the network elements 310.

The network element database 324 stores information associated with network element ID codes, such as location data, related component data, component type data, test specification data, proximate network element data, user-understandable (friendly) names, previous test statuses, previous test results, expected test results, the position of the element in a larger element (e.g., the position of each jack in a wall plate), date and time of testing, the name of the technician doing the testing, etc. The location data describes the location of the associated network element 310, which can include a location relative to a reference point, geolocation information, absolute location information (e.g., latitude/longitude) etc.

The related component data can describe the relation of the associated network element 310 relative to other network elements 310. For example, the location data can indicate that the network element 310 is included in another identified network element 310, such as a wall plate, patch panel, rack, or wiring closet. If the network element 310 is included in an array of another network element 310, the location data can indicate a position of the network element 310 in the array. If the network element 310 includes other elements, such when the network element 310 is a wall plate, patch panel, rack, or wiring closet, the location data can identify each network element 310 that is included, which can include describing relative positions of each included network element 310. The location data can identify one or more maps that include the network element.

The component type data can indicate the type of component that describes the network element 310, such as a manufacturer, make, and/or model of the network element 310.

The proximate network element data can identify one or more other network elements 310 that are proximate to the network element 310, and indicate the spatial relationship between the network element 310 and the one or more other network elements 310.

The map database 326 includes a plurality of maps of communication network sites. A map of a communication network site can include multiple related maps or a single map so that various levels of information can be obtained that describes the layout of network elements 310 at the site. For example, a focused map of a specific area of the site can be obtained by zooming in, or a map of a larger area of the site or the entire site can be provided by zooming out. For example, a focused map can be provided of one story of a multiple story site. In another example, a focused map can be provided of a wall plate, patch panel, rack, or wiring closet. The maps can be previously stored and/or can be created and/or updated by one or more testing devices 302.

The specification database 228 can indicate testing specifications associated with respective component types. The testing specifications can include international specifications or specifications indicated by the manufacturer. Specifications by the manufacturer can include ideal specifications and/or actual specifications. The international specifications can be specified by governing bodies of various countries. The ideal manufacturer specifications can be specified by the manufacturer as ideal values for test results. The actual manufacturer specifications can be specified by the manufacturer as actual factory test result values. A determination of success of a testing procedure can be based, at least in part, on the actual test result values. For example, if ideal values and actual values are not consistent, a testing procedure can be determined to be successful if the actual test results are achieved within a specified range.

The configuration database 230 can include configuration specifications for configuring a testing device 302 to perform a testing procedure. The numbering convention database 332 specifies a numbering convention for advancing through IDs of an array of cable interfaces. When a testing tool 302 is informed about the numbering convention used, it can adopt the numbering convention to advance through the IDs of an array of cable interfaces under test by using the numbering convention to automatically select the next ID of a cable interface to test.

There are many ways to sequentially number cables and network elements, including TIA/EIA 606-A or proprietary schemes. In TIA/EIA 606-A, an example cable ID 2A-C01 might indicate that the identified cable is located at the second floor, transition room A, patch panel C, position 1. The cable IDs can be sequentially advanced through by advancing through the positions, then the patch panels, then the transition rooms, then the floors. In an example of a proprietary scheme (which could use any numbering method) an example cable ID A2_01_07_17 might indicate building A, floor 2, closet 01, panel 7, position 17. The cable IDs can be sequentially advanced through in a similar fashion as the example for TIA/EIA 606-A, using the proprietary cable ID format.

The database 314 includes at least one storage device and software for storing, managing, and accessing data. The databases 322-330, in the entirety, portions thereof, or copies thereof, can be stored or accessible locally by the testing device 302, instead of or in addition to being included with database 314.

With reference now to FIGS. 6-10, shown are flowcharts demonstrating implementation of the various exemplary embodiments. It is noted that the order of steps shown in FIGS. 6-10 is not required, so in principle, the various steps may be performed out of the illustrated order. Also certain steps may be skipped, different steps may be added or substituted, or selected steps or groups of steps may be performed in a separate application following the embodiments described herein.

Figure 6:
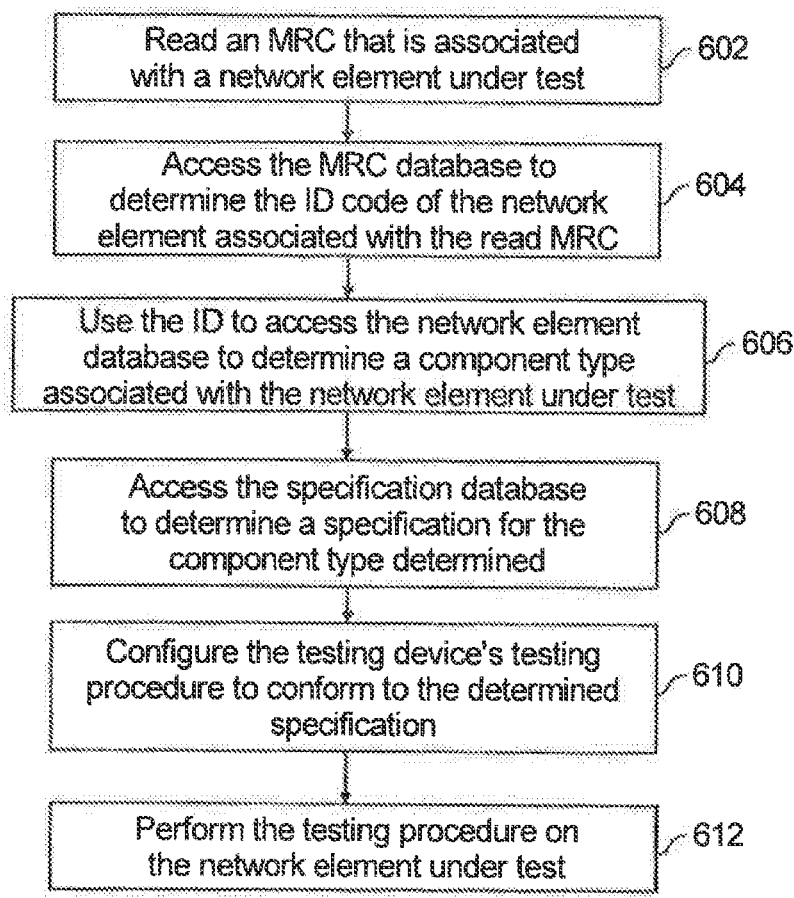
FIG. 6 illustrates a flowchart illustrating a method for configuring the testing device shown in FIG. 4 using a machine-readable code in accordance with appropriate specifications.

FIG. 6 is a flowchart showing the operations performed during a testing procedure for automatically configuring a testing device 302. At operation 602, a testing device 302 reads a machine-readable code 312 that is associated with a network element 310 under test. At operation 604, the testing device 302 accesses the machine-readable code database 322 to determine the ID code of the network element 310 associated with the machine-readable code 312 read. At operation 606, the testing device 302 uses the ID to access the network element database 324 to determine a component type associated with the network element 310 under test.

At operation 608, the testing device 302 accesses the specification database to determine a specification for the component type determined. For example, the specification can include one of an international testing specification associated with the country in which the testing device 302 is presently located, a manufacturer ideal testing specification provided by the manufacturer of the network element 310 under test, manufacturer actual testing specifications provided by the manufacturer of the network element 310 under test. At operation 610, the testing device 302 configures its testing procedure to conform to the determined specifications. Configuration by the testing device 302 can include selecting a configuration file from a database of configuration files based on the specification determined. At operation 612, the testing device 302 performs the testing procedure on the network element 310 under test, wherein success of the testing procedure can be judged based on the determined specifications.

Figure 7:
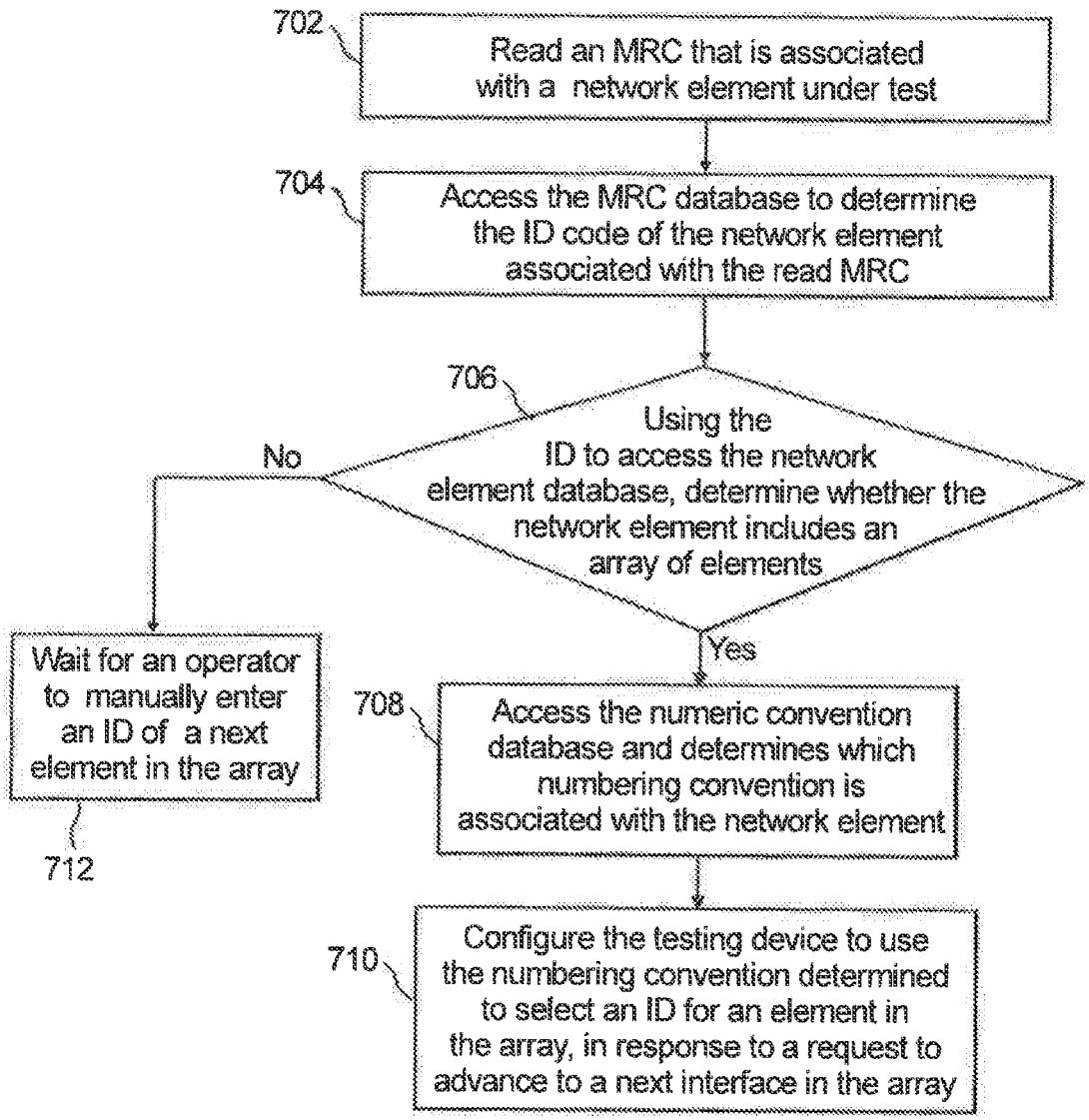
FIG. 7 illustrates a flowchart illustrating a method for configuring the testing device shown in FIG. 4 using a machine-readable code to select appropriate identification numbers for network elements configured in an array using machine-readable codes.

FIG. 7 is a flowchart showing the operations performed during a testing procedure for configuring a testing device 302 to automatically advance to a next network element 310 in an array of network elements 310 in accordance with an appropriate numbering convention. At operation 702, a testing device 302 reads a machine-readable code 312 that is associated with a network element 310 under test. At operation 704, the testing device 302 accesses the machine-readable code database 322 to determine the ID code of the network element 310 associated with the machine-readable code 312 read. At operation 706, the testing device 302 uses the ID to access the network element database 324 to determine whether the network element 310 includes an array of elements, such as network elements 310 or interfaces, such as when the network element 310 is a wall plate, patch panel, rack, or wiring closet.

If the determination at operation 706 is NO, the method continues at operation 712, and if the determination at operation 706 is YES, the method continues at operation 708. At operation 708, the testing device 302 accesses the numbering convention database 332 and determines which numbering convention is associated with the network element 310. At operation 710, the testing device 302 uses the numbering convention determined to select an ID for an element in the array, in response to a request to advance to a next interface in the array, in accordance with the numbering convention. At operation 712, the testing device 302 waits for an operator to manually enter an ID of a next element in the array.

Figure 8:
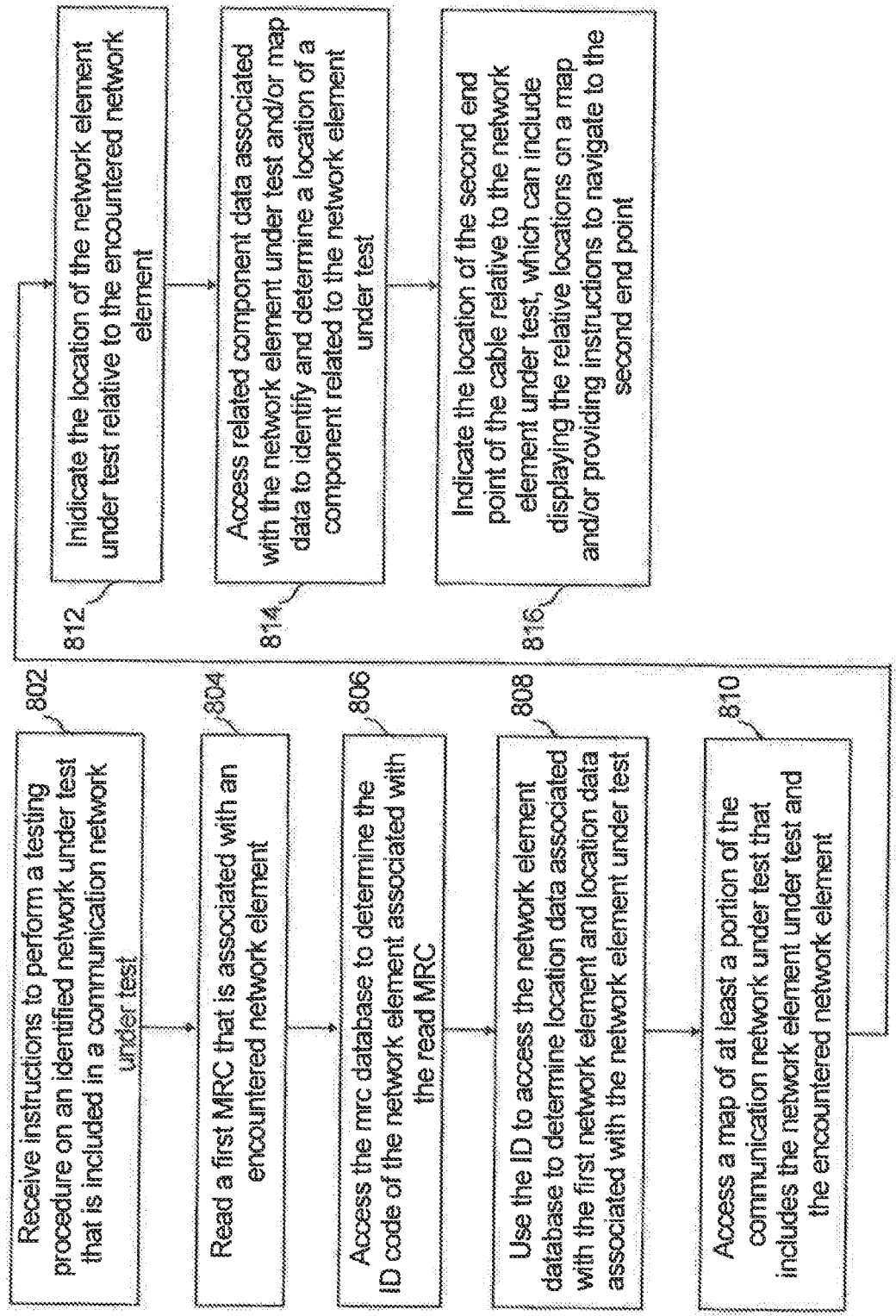
FIG. 8 illustrates a flowchart illustrating a method performed by the testing device shown in FIG. 4 for locating a network element using a machine-readable code.

FIG. 8 is a flowchart showing the operations performed during a testing procedure. At operation 802, a testing device 302 receives instructions to perform a testing procedure on an identified network element 310 (the network element 310 under test) that is included in a communication network under test 308. At operation 804, a user operating the testing device 302 approaches the site of the communication network under test 308 and encounters and reads a first machine-readable code 312 that is associated with a network element 310 (the encountered network element 310). The user may not yet know the location of the network element 310 under test. The user can obtain information obtained from reading the first machine-readable code 312 to locate the network element 310 under test. Upon reading the first machine-readable code 312, the machine-readable code reader 406 outputs machine-readable code data.

At operation 806, the testing device 302 accesses the machine-readable code database 322 to determine the ID code of the associated, encountered network element 310. At operation 808, the testing device 302 uses the ID to access the network element database 324 to determine location data associated with the network element 310 encountered and location data associated with the network element 310 under test.

At operation 810, the testing device 302 can optionally access a map of at least a portion of the communication network under test 308 that includes the network element 310 under test and the encountered network element 310. At operation 812, the testing device 302 indicates the location of the network element 310 under test relative to the location of the encountered network element 310. For example, the testing device 302 can provide information for navigating to the network element 310 under test from the encountered network element 310. For example, the testing device 302 can display a portion of the map accessed with a visual indication of the location of the encountered network element 310 relative to the network element 310 under test. In addition or alternatively, the testing device 302 may further output instructions how to navigate from the location of the encountered network element 310 to the location of the network element 310 under test.

At operation 814, the testing device 302 can further access related component data associated with the network element 310 under test and/or map data to identify and determine a location of a component related to the network element 310 under test. For example, the network element 310 under test may be a first end point of a cable, and the related component may be a second end point of the cable. At operation 816, the testing device 302 can indicate the location of the second end point of the cable relative to the network element 310 under test, which can include displaying the relative locations on a map and/or providing instructions to navigate to the second end point.

Figure 9:
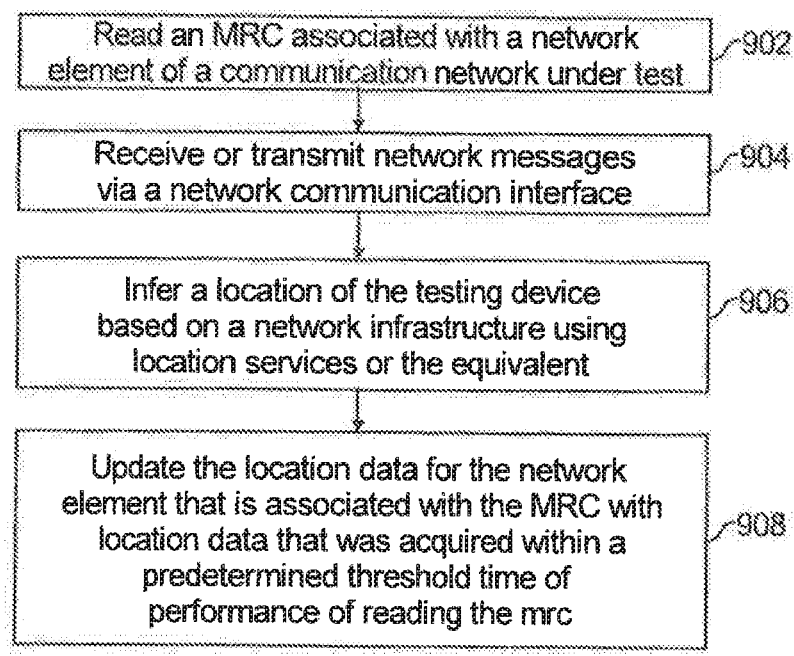
FIG. 9 illustrates a flowchart illustrating a method performed by the testing device shown in FIG. 4 for inferring a location of a network element using a machine-readable code.

FIG. 9 is a flowchart showing the operations performed during a testing procedure. At operation 902, a testing device reads a machine-readable code 312 associated with a network element 310 of a communication network under test 308. At operation 904, the testing device 302 receives or transmits network messages via a network communication interface. At operation 906, the testing device 302 infers a location of the testing device 302 based on a network infrastructure, e.g., WIFI access points or cell towers, using location services or the equivalent. The location can be a geolocation and/or a position of the testing device 302 in the site of the communication network under test 308, such as relative to a floor map. Alternatively, such as when the machine-readable code 312 is located outdoors, the location, e.g., latitude and longitude, can be obtained using global position satellite (GPS).

At operation 908, the testing device 302 updates the location data for the network element 310 that is associated with the machine-readable code 312 with location data that was acquired within a predetermined threshold time of performance of operation 902. Updating the location data can be performed based on a statistic that incorporates the approximate geolocation. The statistic can be, for example, an average of geolocations determined for testing devices 302 within the predetermined time. The predetermined threshold of time is selected so that the location data is only used if acquired while the testing device 302 is still located at the location of the machine-readable code 312 that is adjacent the network element 310, and has not been moved to another location.

Figure 10:
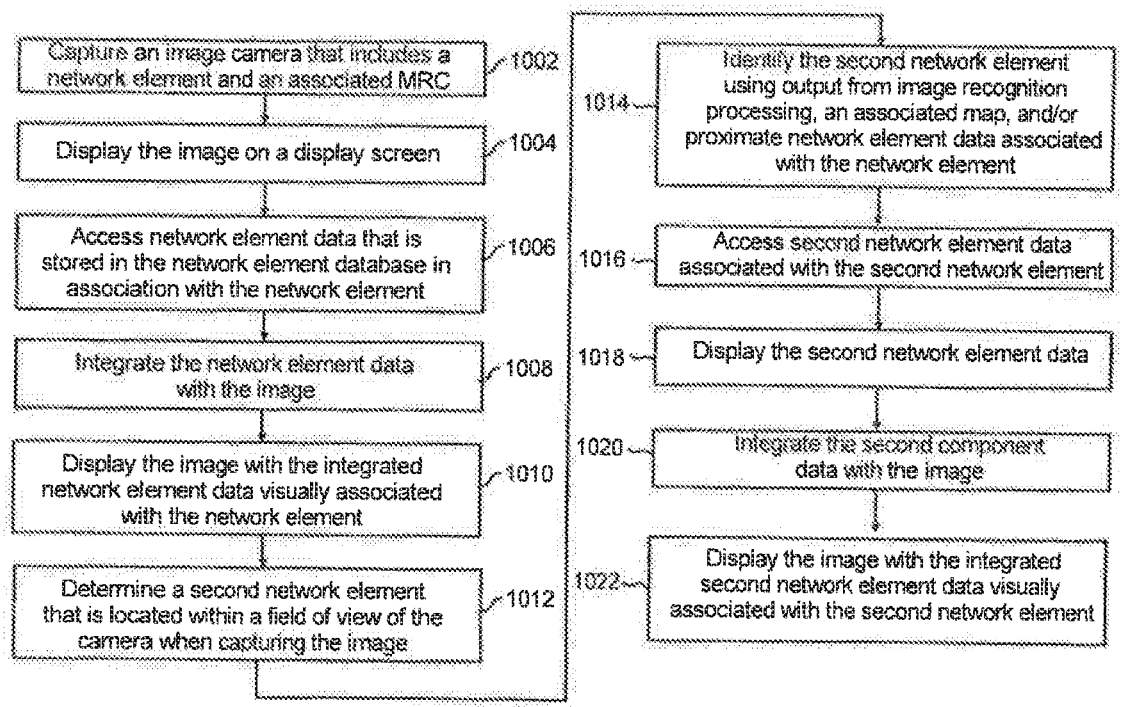
FIG. 10 illustrates a flowchart illustrating a method performed by the testing device shown in FIG. 4 for enhancing an image of network elements with data associated with the network elements using a machine-readable code.

FIG. 10 is a flowchart showing the operations performed during a testing procedure that uses augmented reality to display information associated with network elements 310 that are displayed in an image. At operation 1002, testing device 302 captures an image using camera 410 that includes a network element 310 and an associated machine-readable code 312. The image includes image data that corresponds to the network element 310 and the machine-readable code 312 in the image. At operation 1004, the testing device 302 displays the image on a display screen. At operation 1006, the testing device 302 accesses network element data (e.g., location data, related component data, component type data, and test specification data) that is stored in the network element database 324 in association with the network element 310. At operation 1008, the testing device 302 integrates the network element data with the image. At operation 1010, the testing device 302 displays the image with the integrated network element data visually associated with the network element 310.

At operation 1012, the testing device determines a second network element 310 that is located within a field of view of the camera 410 when capturing the image. The determination can be performed by recognizing an associated machine-readable code 312 or recognizing the network element 310 itself using image recognition processing techniques that are known to those skilled in the art, such as edge detection and feature detection. This can be facilitated by placing information related to the expected image and network components within the image in the database. At operation 1014, the second network element 310 is identified using output from the image recognition processing, an associated map, and/or proximate network element data associated with the network element 310. The associated map includes the network element 310, and identifies other network elements 310 that are proximate the network element 310, including providing spatial relationships there between. At operation 1016, the testing device 302 accesses second network element data associated with the second network element 310. At operation 1018, the testing device displays the second network element data.

At operation 1020, the testing device 302 integrates the second component data with the image. At operation 1022, the testing device displays the image with the integrated second network element data visually associated with the second network element 310.

The integration of the network element data and the second network element data with the image can be performed using augmented reality. The accessed map and the location data associated with the network element 310 and the second network element 310 can be correlated with the positions of elements captured in the image. The location data can include geolocation data determined using location services and/or from a GPS.

In an embodiment, the network element 310, can be a component such as a wall plate, patch panel, rack, or wiring closet, or the like, which includes an array of cable interfaces, and the second network element 310 can include one or more of the cable interfaces in the array, and/or cable end points that are coupled (or are designated to be coupled) to one or more of the cable interfaces in the array. The testing device 302 can integrate second network element data associated with image data of the image that corresponds to the respective cable end points or the interface. The testing device 302 can display the image with the integrated second component data visually associated with each of the respective cable end points and/or the interfaces in the array.

In an embodiment, the camera 410 can capture a series of images. The testing device 302 can use the machine-readable code in the image as a reference point to perform the integration of the network element data and the second network element data with the series of images, which can be performed using augmented reality.

In an embodiment, the testing device 302 can generate a unique machine-readable code 312 and associate the machine-readable code 312 generated with a network element 310 that does not yet have an associated machine-readable code and output the machine-readable code 312 to at least one of a database, such as the machine-readable code database 322, and a printer. In an embodiment, the testing device 302 includes a printer 418. The printer 418 can print the machine-readable code 312 so that the machine-readable code 312 can be affixed adjacent to the associated network element 310 once the machine-readable code 312 is generated.

The unique machine-readable code can be associated, for example, with at least one of: a history of testing procedures associated with the network element; a history of troubleshooting procedures performed in association with the network element; changes to hardware, configuration, or location of the network element; a particular malfunction associated with the network element; inventory of other network elements in a vicinity of the network element; a specified time period (e.g., a log of activities performed in a month time span); a specified operator that interacted with the network element (e.g., a log activities associated with the network element performed by the operator); and other network elements that are associated with the network element (e.g., a cable, a cable end point, a patch panel, an array of interfaces, other test access points included in a same array as the network element).

In an embodiment, machine-readable code 312 and the associated network element data is accessible to a plurality of testing devices 302 for at least one of generating the machine-readable code 312, updating the network element data associated with the machine-readable code 312, and updating the location data included in the network element data. The testing devices 302 can perform collaboratively to at least one of generate the machine-readable code 312, update the network element data associated with the machine-readable code 312, and update the location data included in the network element data.

Since geolocation data determined using location services is an approximated location, each time that one of the testing devices 302 accesses the machine-readable code 312 associated with one of the network elements 310, the testing device 302 can generate an approximated location of the network element 310. The location data stored for that network element 310 can be updated using the newly generated approximated location, such as by averaging all of the approximated locations. Other algorithms for updating the location data can be used, without limitation. Accordingly, the location data can achieve greater accuracy as the testing devices 302 collaboratively update the location data with approximated location information.

In an embodiment, a map can be generated using location data (e.g., geolocation data) associated with machine-readable codes 312, wherein the machine-readable codes 312 can be generated or accessed by the plurality of testing devices 302. The map can be updated as the location data is updated.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

The invention claimed is:

1. A testing device, comprising:
a camera that captures a first image of a first network element and a first machine-readable code;
a display device that displays images to a user of the testing device; and
a computer configured to:
identify the first network element in the first image based on the first machine-readable code in the first image;
obtain first network element data for the first network element;
generate a second image by integrating the first network element data into the first image with the first network element data being visually associated with the first network element in the second image; and
display the second image on the display device.

2. The testing device of claim 1, wherein the computer is further configured to:

identify a second network element in the first image based on a second machine-readable code in the first image;

obtain second network element data for the second network element; and prior to the display of the second image on the display device, integrate the second network element data into the second image with the second network element data being visually associated with the second network element in the second image.

3. The testing device of claim 2, wherein the computer identifies the second network element by being further configured to:

determine a spatial relationship between the first network element and the second network element based on the first network element data of the first network element.

4. The testing device of claim 2, wherein the camera captures a series of images as the camera moves, wherein the computer is further configured to use the first machine-readable code as an image reference point to integrate the first network element data and the second network element data with the series of images using augmented reality.

5. The testing device of claim 1, wherein the computer is further configured to:

determine an identification of a third network element located within a field of view of the camera when capturing the first image;

obtain third network element data for the third network element based on the identification; and display the third network element data in the second image.

6. The testing device of claim 1, wherein the computer is further configured to:

obtain a configuration file based on the first machine-readable code;

configure the testing device to perform a test procedure on the first network element using the configuration file; and perform the test procedure on the first network element.

7. The testing device of claim 6, wherein the computer obtains the configuration file by being further configured to:

determine a component type of the first network element from the first machine-readable code; and select the configuration file from a plurality of configuration files based on the determined component type of the first network element.

8. The testing device of claim 1, wherein the computer is further configured to:

determine a location of a second network element relative to the first network element based on data associated with the first machine-readable code for the first network element; and provide the location of the second network element to a user of the testing device.

9. The testing device of claim 1, wherein the computer is further configured to:

generate a unique machine-readable code to be associated with a second network element that does not yet have an associated machine-readable code; and output the unique machine-readable code to at least one of a storage device or a printer.

10. The testing device of claim 1, wherein the first network element is a first end point of a cable that has the first end point and a second end point, wherein the computer is further configured to:

identify the second endpoint from the first network element data;

determine second network element data associated with the identified second end point;

determine a location of the second end point based on the second network element data; and indicate, by providing at least one of a map or navigational directions, the location of the second end point relative to a location of one of a location reference point and the first end point.

11. The testing device of claim 1, wherein the computer is further configured to:

determine an approximate location of the testing device based on a communication that occurred within a threshold time of identifying the first machine-readable code; and update a location in the first network element data based on a statistic that incorporates the approximate location of the testing device.

12. A method, comprising:

capturing a first image that includes a first network element and a first machine-readable code;

identifying the first network element in the first image based on the first machine-readable code in the first image;

accessing a network element data database to obtain first network element data for the first network element;

generating a second image to include the first network element data being visually associated with the first network element in the second image; and displaying the second image on a display device.

13. The method of claim 12, further comprising:

identifying a second network element in the first image based on a second machine-readable code in the first image;

accessing the network element data database to obtain second network element data for the second network element; and prior to displaying the second image on the display device, including the second network element data being visually associated with the second network element in the second image.

14. The method of claim 13, wherein identifying the second network element includes:

determining a spatial relationship between the first network element and the second network element based on the first network element data of the first network element.

15. The method of claim 13, further comprising:

capturing a series of images as a camera moves; and using the first machine-readable code as an image reference point to integrate the first network element data and the second network element data with the series of images using augmented reality.

16. The method of claim 12, further comprising:

obtaining a configuration file based on the first machine-readable code;

configuring a testing device to perform a test procedure on the first network element using the configuration file; and performing the test procedure on the first network element.

17. The method of claim 16, wherein obtaining the configuration file includes:

determining a component type of the first network element from the first machine-readable code; and selecting the configuration file from a plurality of configuration files based on the determined component type of the first network element.

18. The method of claim 13, further comprising:
determining a location of a second network element relative to the first network element based on data associated with the first machine-readable code for the first network element; and
providing the location of the second network element to a user.

19. A mobile device, comprising:
a testing unit to perform test procedures on network elements of a communication network;
a camera that captures a first image of a network element and a machine-readable code;
a display device that displays images to a user of the mobile device; and
a computer configured to:
   identify the network element in the first image based on the machine-readable code in the first image;
   obtain network element data for the network element, including a configuration file to perform a test procedure on the network element;
   generate a second image by integrating the network element data into the first image with the network element data being visually associated with the network element in the second image;
   display the second image on the display device;
   configure the testing unit to perform the test procedure on the network element using the configuration file; and
   instruct the testing unit to perform the test procedure on the network element.

\* \* \* \* \*